US012284155B2

United States Patent
Mukherjee

(10) Patent No.: US 12,284,155 B2
(45) Date of Patent: Apr. 22, 2025

(54) PROVIDING EXPLAINABLE ARTIFICIAL INTELLIGENCE USING DISTRIBUTED LEDGER TECHNOLOGY

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 56 days.

(21) Appl. No.: 18/370,617

(22) Filed: Sep. 20, 2023

(65) Prior Publication Data

US 2025/0097195 A1 Mar. 20, 2025

(51) Int. Cl.
*H04L 9/40* (2022.01)
*G01D 21/02* (2006.01)
*G06F 40/30* (2020.01)
*G06N 20/00* (2019.01)
*H04L 9/00* (2022.01)
*H04L 41/16* (2022.01)

(52) U.S. Cl.
CPC ........ *H04L 63/0209* (2013.01); *G01D 21/02* (2013.01); *G06F 40/30* (2020.01); *G06N 20/00* (2019.01); *H04L 9/50* (2022.05); *H04L 41/16* (2013.01)

(58) Field of Classification Search
CPC ... H04L 63/0209; H04L 9/12; H04L 67/1097; H04L 9/3297; H04L 63/0407; H04L 47/70; H04L 9/3239; H04L 67/10; H04L 9/0637; G06F 16/182; G06F 9/5072; G06F 40/30; G06Q 10/04; G06Q 20/065; G06Q 10/06375; G06Q 10/06; G06Q 20/06; G01D 21/02; G01N 27/416; G06N 20/00
See application file for complete search history.

(56) References Cited

U.S. PATENT DOCUMENTS

| 11,373,132 B1 | 6/2022 | Sweet et al. |
| 11,468,998 B2 | 10/2022 | Koblick et al. |
| 11,636,284 B2 | 4/2023 | Ghosh et al. |

(Continued)

FOREIGN PATENT DOCUMENTS

| WO | WO-2022080583 A1 * | 4/2022 | ............ G06F 40/30 |
| WO | WO-2023030513 A1 * | 3/2023 | ............ G01D 21/02 |

OTHER PUBLICATIONS

Explainable AI—https://www.ibm.com/topics/explainable-ai.

*Primary Examiner* — Kyung H Shin
(74) *Attorney, Agent, or Firm* — Banner & Witcoff, Ltd.

(57) ABSTRACT

Aspects related to providing explainable artificial intelligence (XAI) using distributed ledger technology are provided. An XAI platform may train a first iteration of a deep learning model. The platform may store a record of the model to a distributed ledger. The platform may automatically perform an iterative recording process to generate additional iterations of the model and store records of the additional iterations of the model. During the process, the platform may receive outputs of the model. Based on the outputs, the platform may identify an anomalous output. The platform may identify one or more source iterations of the model that correspond to the anomalous output. The platform may initiate one or more response actions based on identifying the one or more source iterations of the model.

20 Claims, 8 Drawing Sheets

(56) References Cited

U.S. PATENT DOCUMENTS

| | | |
|---|---|---|
| 11,741,177 B2 | 8/2023 | Kwatra et al. |
| 2018/0330253 A1* | 11/2018 | Gottschlich ............ G06N 20/00 |
| 2019/0188046 A1* | 6/2019 | Florissi ............... H04L 63/0209 |
| 2021/0377310 A1 | 12/2021 | Fernando et al. |
| 2022/0004923 A1 | 1/2022 | Kamkar et al. |
| 2022/0012591 A1 | 1/2022 | Dalli et al. |
| 2022/0067520 A1 | 3/2022 | Dalli et al. |
| 2022/0121884 A1 | 4/2022 | Zadeh et al. |
| 2022/0147876 A1 | 5/2022 | Dalli et al. |
| 2022/0172050 A1 | 6/2022 | Dalli et al. |
| 2022/0188674 A1 | 6/2022 | Liao et al. |
| 2022/0198304 A1 | 6/2022 | Szczepanik et al. |
| 2022/0237565 A1 | 7/2022 | Dzierzanowski et al. |
| 2022/0245355 A1 | 8/2022 | Gnanasambandam et al. |
| 2022/0398460 A1 | 12/2022 | Dalli et al. |
| 2023/0177502 A1 | 6/2023 | Gnanasambandam et al. |
| 2023/0187036 A1 | 6/2023 | Gnanasambandam et al. |
| 2023/0195712 A1 | 6/2023 | Carpentier et al. |
| 2023/0281606 A1 | 9/2023 | Jakobsson et al. |

* cited by examiner

PROVIDING EXPLAINABLE ARTIFICIAL INTELLIGENCE USING DISTRIBUTED LEDGER TECHNOLOGY

BACKGROUND

Aspects described herein are related to providing explainable artificial intelligence using distributed ledger technology. In some instances, entities such as an enterprise organization (e.g., a financial institution, and/or other institutions) may utilize one or more artificial intelligence (AI) machine learning models to solve problems related to a business venture pursued by the entity. However, after providing training information, many of the processes involved in training and refining/updating the AI models may occur automatically, in a manner opaque to the human programmers and/or to the systems utilizing the models. As these AI models continue to become more advanced, human programmers and/or computer systems are challenged to comprehend and retrace how the model produced a specific result. Therefore, if a model is producing unexpected results, whether positive or negative in nature, it may become nearly impossible for a human programmer and/or computer system utilizing the model to identify what caused the model to produce the unexpected result. Accordingly, it may be important to provide a process by which an AI model's processes and potential biases can be explained to a programmer and/or computer system utilizing the AI model.

SUMMARY

Aspects of the disclosure provide effective, efficient, scalable, and convenient technical solutions that address and overcome the technical problems associated with current methods of sharing information related to investigations of impact events. In accordance with one or more arrangements of the disclosure, a computing platform with at least one processor, a communication interface, and memory storing computer-readable instructions may train a first iteration of a deep learning model based on a training data set. Training the first iteration of the deep learning model may configure the deep learning model to output results based on input data. The computing platform may store a record of the first iteration of the deep learning model to a distributed ledger. The record of the first iteration of the deep learning model may include first clustering information that identifies clusters of information of the first iteration of the deep learning model. The record of the first iteration of the deep learning model may additionally or alternatively include first rationale information that identifies digital logic used to generate the clusters of information. The computing platform may automatically perform an iterative recording process for training the deep learning model. The iterative recording process may store records of additional iterations of the deep learning model. The computing platform may receive one or more outputs of the deep learning model while performing the iterative recording process. The computing platform may identify an anomalous output based on the one or more outputs. The computing platform may identify one or more source iterations of the deep learning model by parsing the distributed ledger and based on identifying the anomalous output. The one or more source iterations may correspond to the anomalous output. The computing platform may initiate one or more response actions configured to prevent additional anomalous outputs based on identifying the one or more source iterations.

In one or more arrangements, the iterative recording process may begin at a first iteration of the deep learning model, as a current iteration. The iterative recording process may include generating a second iteration of the deep learning model. The iterative recording process may include storing a second record of the second iteration to the distributed ledger based on generating the second iteration of the deep learning model. The second record may include second clustering information and second rationale information. The iterative recording process may include automatically repeating the iterative recording process for one or more additional iterations of the deep learning model in one or more additional iterations of the iterative recording process.

In one or more examples, the computing platform may update the deep learning model based on initiating the one or more response actions. In one or more arrangements, the computing platform may store a record of the updated deep learning model to the distributed ledger based on updating the deep learning model. In one or more examples, the computing platform may pause the iterative recording process based on identifying the anomalous output. The computing platform may resume the iterative recording process based on updating the deep learning model.

In one or more arrangements, the computing platform may identify the anomalous output by comparing one or more scores, generated by the deep learning model and corresponding to the one or more outputs, to a threshold score. The computing platform may further identify the anomalous output by identifying, based on comparing the one or more scores to the threshold score, a score that satisfies the threshold score. The computing platform may further identify the anomalous output by identifying an output corresponding to the score that satisfies the threshold score as the anomalous output.

In one or more examples, the anomalous output may include a data point that toggles between different clusters of nodes of the deep learning model. In one or more arrangements, the one or more source iterations may each correspond to a unique record stored in the distributed ledger. The unique records may each include an indication that a data point associated with the anomalous output diverged from a first cluster of the deep learning model to a second cluster of the deep learning model. In one or more arrangements, the computing platform may identify the one or more source iterations by identifying, by parsing the distributed ledger, a first record indicating that a data point associated with the anomalous output diverged from a first cluster of the deep learning model to a second cluster of the deep learning model. The computing platform may further identify the one or more source iterations by selecting an iteration of the deep learning model corresponding to the first record as the one or more source iterations based on identifying the first record.

In one or more examples, the computing platform may identify the one or more source iterations by identifying, by parsing each entry of the distributed ledger, a plurality of records indicating that a data point associated with the anomalous output diverged from a first cluster of the deep learning model to a second cluster of the deep learning model. The computing platform may further identify the one or more source iterations by selecting a plurality of iterations of the deep learning model corresponding to the plurality of records as the one or more source iterations based on identifying the plurality of records. In one or more arrangements, the computing platform may initiate the one or more response actions based on a ruleset identifying one or more parameters for modifying the deep learning model. In one or more examples, the one or more response actions may include one or more of: removing a feature of the deep learning model, modifying one or more clusters of neurons of the deep learning model, reverting to a previous iteration of the deep learning model, and/or adjusting one or more weights corresponding to an algorithm of the deep learning model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
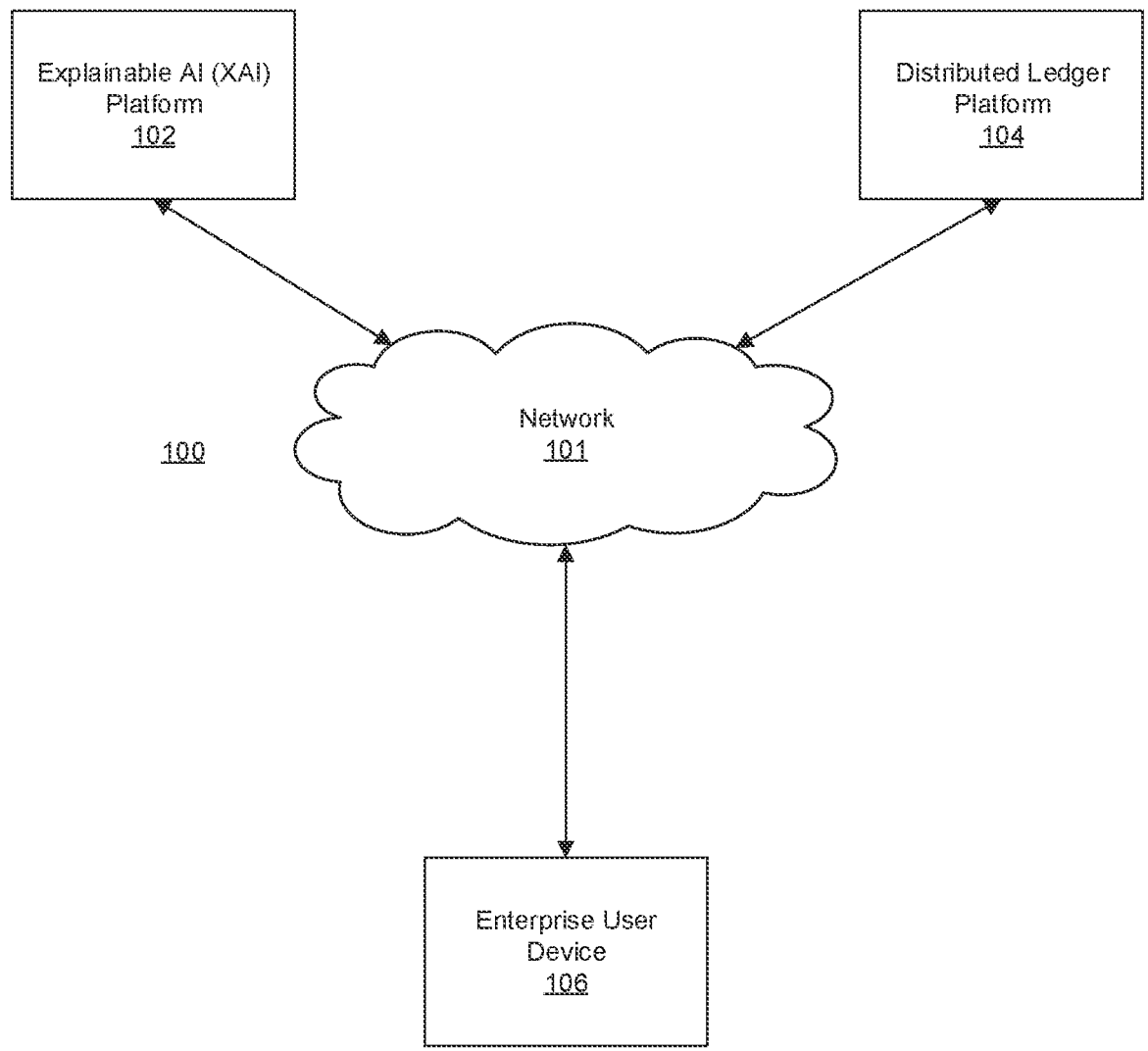
FIGS. 1A-1B depict an illustrative computing environment for providing explainable AI using distributed ledger technology in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to providing explainable AI using distributed ledger technology. In some instances, entities such as an enterprise organization (e.g., a financial institution, and/or other institutions) may utilize one or more artificial intelligence (AI) machine learning models to solve problems related to a business venture pursued by the entity. For example, entities may use one or more deep learning AI models. Conventional deep learning models are sometimes trained using supervised and/or unsupervised learning techniques, where sets of training data are broken up into clusters based on various criteria. However, as the deep learning model continues to refine and/or update itself to increase accuracy and/or efficiency, the clustering process occurs "under the hood" (i.e., the clustering/training of the model is opaque to the individuals and/or systems utilizing the model). As a result, it may be difficult for human programmers and/or systems to determine what causes an AI model to produce particular results. For example, in some instances, an AI model may output a result based on an algorithm that has undergone multiple iterations and/or revisions. It may not be possible for a human programmer and/or for a computer system to identify, using conventional methods, at which iteration of the algorithm the AI model "learned" to produce the particular results. Thus, there exists a need for providing a means by which an AI model's outputs and/or biases can be explained, in order to determine why a particular result occurred.

Accordingly, in some instances, entities such as an enterprise organization and/or other organizations/institutions may employ an explainable AI (XAI) platform, as described herein. An XAI platform may be configured to integrate with and/or utilize a distributed ledger, such as a blockchain system, to provide a set of processes and methods that allow human users and/or computer systems to comprehend and trust the results and outputs created by AI machine learning models and/or algorithms. For example, in integrating with and/or utilizing the distributed ledger, the XAI platform may store records of each iteration of an iteratively-trained deep learning model. The record may include clustering information identifying how the clusters of data (e.g., "neurons") of the deep learning model were configured in each iteration, rationale information indicating the digital logic used to generate the clusters of neurons, and/or any other information related to training a given iteration of the deep learning model. The records may be used by human programmers and/or computer systems to identify a source (e.g., a particular clustering configuration, particular digital training logic, and/or other sources) of an output of the deep learning model, produced by a subsequent iteration of the deep learning model. For example, based on identifying an anomalous output, the XAI platform may be used to parse the distributed ledger and identify which iteration of the deep learning model includes the source of the anomalous output. Accordingly, the XAI platform may be used to initiate one or more response actions configured to prevent additional anomalous outputs from occurring and/or configured to ensure subsequent outputs of the deep learning model conform to the anomalous output.

These and various other aspects will be discussed more fully herein.

Figure 1B:
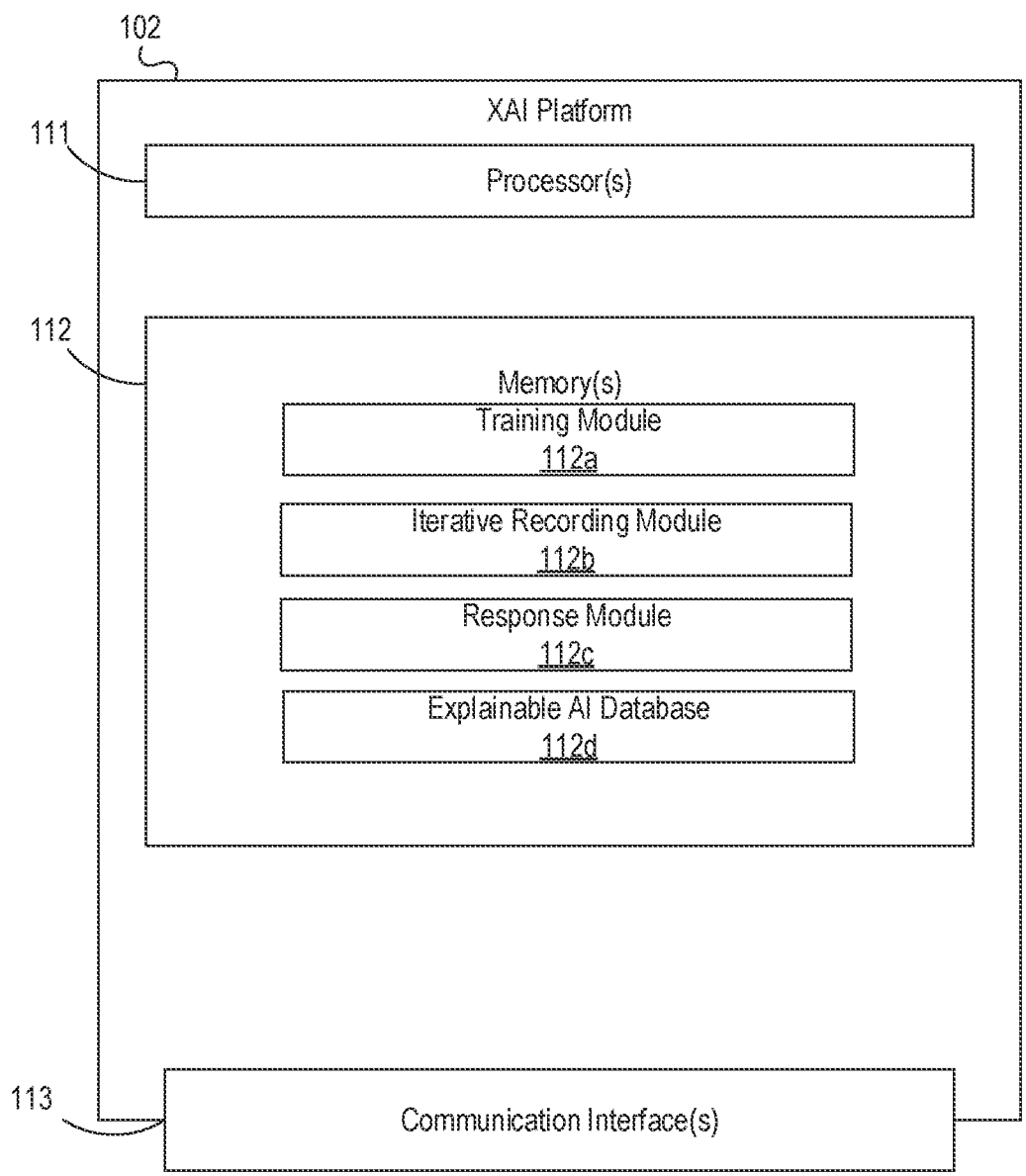

FIGS. 1A-1B depict an illustrative computing environment for providing explainable AI using distributed ledger technology in accordance with one or more example arrangements. Referring to FIG. 1A, computing environment 100 may include one or more computer systems. For example, computing environment 100 may include an explainable AI (XAI) platform 102, a distributed ledger platform 104, and an enterprise user device 106.

As described further below, XAI platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., deep learning models, and/or other models). For example, the XAI platform 102 may train the one or more machine learning models to generate various outputs based on training data and/or input data. The XAI platform 102 may be managed by and/or otherwise associated with an enterprise organization (e.g., a financial institution, and/or other institutions) that may, e.g., be associated with one or more additional systems (e.g., distributed ledger platform 104, enterprise user device 106, and/or other systems). In one or more instances, the XAI platform 102 may be configured to communicate with one or more systems (e.g., distributed ledger platform 104, enterprise user device 106, and/or other systems) to perform an information transfer, display an interface, store a record of a machine learning model, and/or perform other functions.

The distributed ledger platform 104 may be and/or otherwise include one or more computing devices (e.g., servers, server blades, and/or other devices) and/or other computer components (e.g., processors, memories, communication interfaces) that may be used to manage a distributed ledger. For example, distributed ledger platform 104 may be configured to host, maintain, and/or otherwise access a distributed ledger to store and/or validate records of machine learning models. In one or more instances, the distributed ledger platform 104 may be configured to communicate with one or more systems (e.g., XAI platform 102, and/or other systems) to store records of machine learning models, and/or to perform other functions. Although depicted as a separate device, in some instances the distributed ledger platform 104 may be integrated with and/or otherwise included in the XAI platform 102 without departing from the scope of this disclosure.

The enterprise user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., receiving notifications of identified source iterations of a machine learning model, displaying an interface, and/or other functions). In one or more instances, enterprise user device 106 may correspond to a first entity (e.g., an enterprise organization, such as a financial institution and/or other institution). For example, the enterprise user device 106 may correspond to the same entity associated with the XAI platform 102. In one or more instances, the enterprise user device 106 may be configured to communicate with one or more systems (e.g., XAI platform 102, and/or other systems) to receive a notification, display an interface, and/or to perform other functions. In some instances, the enterprise user device 106 may be configured to display one or more graphical user interfaces (e.g., AI explanation interfaces, and/or other interfaces).

Although only one user/enterprise device is depicted herein, any number of such systems may be used to implement the methods described herein without departing from the scope of the disclosure.

Computing environment 100 also may include one or more networks, which may interconnect XAI platform 102, distributed ledger platform 104, and enterprise user device 106. For example, computing environment 100 may include a network 101 (which may interconnect, e.g., XAI platform 102, distributed ledger platform 104, and enterprise user device 106).

In one or more arrangements, XAI platform 102, distributed ledger platform 104, and enterprise user device 106 may be any type of computing device capable of sending and/or receiving requests and processing the requests accordingly. For example, XAI platform 102, distributed ledger platform 104, enterprise user device 106, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of XAI platform 102, distributed ledger platform 104, and enterprise user device 106, may, in some instances, be special-purpose computing devices configured to perform specific functions.

Referring to FIG. 1B, XAI platform 102 may include one or more processors 111, memory 112, and communication interface 113. A data bus may interconnect processor 111, memory 112, and communication interface 113. Communication interface 113 may be a network interface configured to support communication between XAI platform 102 and one or more networks (e.g., network 101, or the like). Communication interface 113 may be communicatively coupled to the processor 111. Memory 112 may include one or more program modules having instructions that, when executed by processor 111, cause XAI platform 102 to perform one or more functions described herein and/or one or more databases (e.g., an explainable AI database 112*d*, or the like) that may store and/or otherwise maintain information which may be used by such program modules and/or processor 111. In some instances, the one or more program modules and/or databases may be stored by and/or maintained in different memory units of XAI platform 102 and/or by different computing devices that may form and/or otherwise make up XAI platform 102. For example, memory 112 may have, host, store, and/or include a training module 112*a*, an iterative recording module 112*b*, a response module 112*c*, an explainable AI database 112*d*, and/or other modules and/or databases.

Training module 112*a* may have instructions that direct and/or cause XAI platform 102 to train, implement, and/or update iterations of a machine learning model, generate outputs of a machine learning model, and/or perform other functions. In some instances, the training module 112*a* may be used by XAI platform 102 to refine and/or otherwise update machine learning models based on methods of explaining AI, and/or other methods described herein. Iterative recording module 112*b* may have instructions that direct and/or cause XAI platform 102 to communicate with a distributed ledger (e.g., distributed ledger platform 104, or the like), store iterative records of a machine learning model, and/or perform other functions. Response module 112*c* may have instructions that direct and/or cause XAI platform 102 to identify anomalous outputs of a machine learning model, identify source iterations of the anomalous outputs, initiate response actions, and/or perform other functions. Explainable AI database 112*d* may have instructions causing XAI platform 102 to store source outputs of a machine learning model, and cluster information of a machine learning model, rationale information for training a machine learning model, and/or other information.

Although training module 112*a*, iterative recording module 112*b*, response module 112*c*, and explainable AI database 112*d* are depicted as separate modules herein, the instructions stored by these modules may be stored in any number of modules without departing from the scope of this disclosure.

Figure 2A:
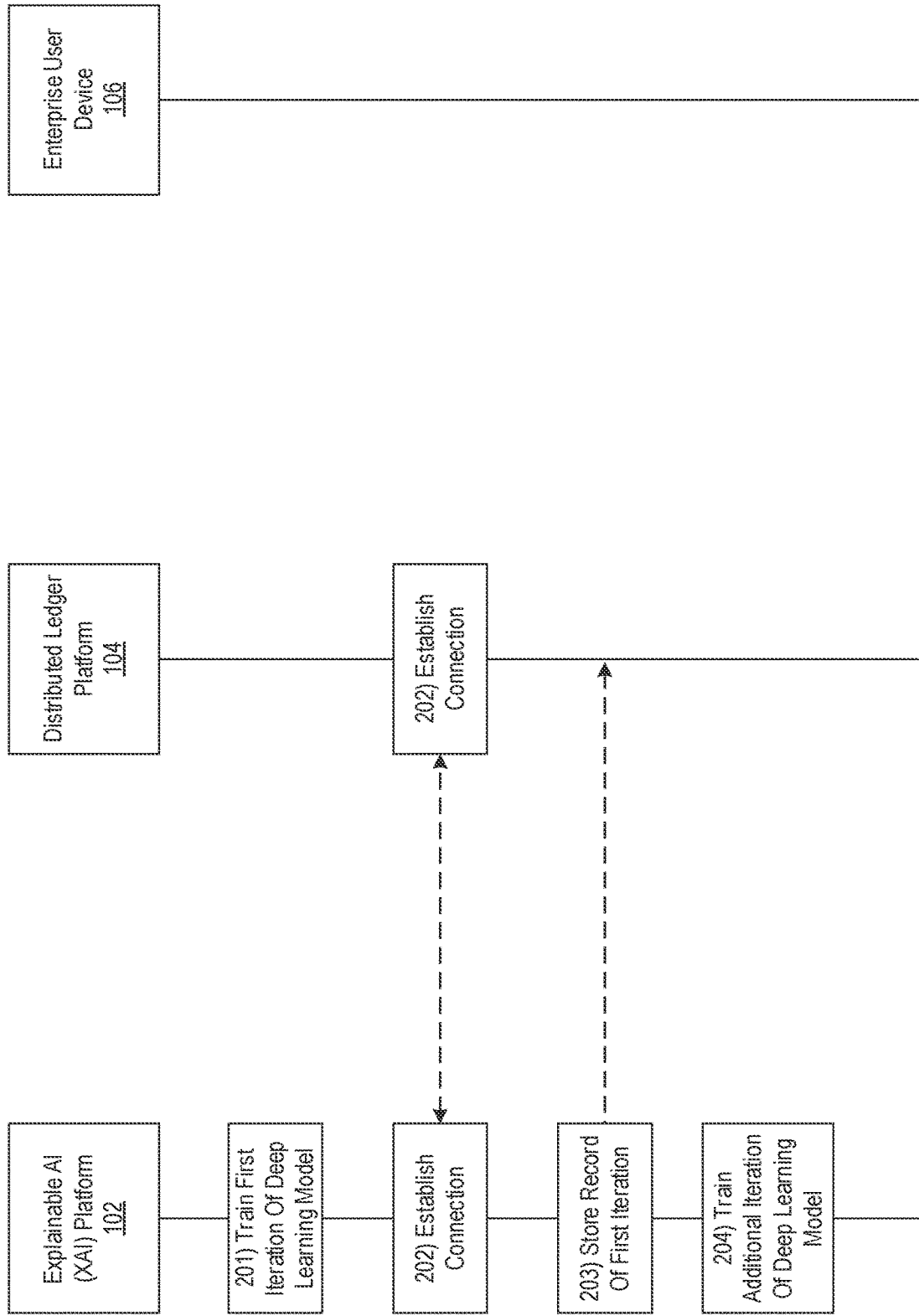
FIGS. 2A-2D depict an illustrative event sequence for providing explainable AI using distributed ledger technology in accordance with one or more example arrangements.

FIGS. 2A-2D depict an illustrative event sequence for providing explainable AI using distributed ledger technology in accordance with one or more example arrangements. Referring to FIG. 2A, at step 201, the XAI platform 102 may train a machine learning model. For example, the XAI platform 102 may train a first iteration of a deep learning model to generate particular outputs based on particular inputs that correspond to learned patterns and/or instructions stored by the deep learning model. In some instances, the XAI platform 102 may configure and/or otherwise train the first iteration of the deep learning model based on training information, such as historical output information that corresponds to one or more desired outputs of the deep learning model. For example, a user of the XAI platform 102 may supply a training information set of desired results of one or more processes the deep learning model is configured to emulate and/or replicate. Accordingly, the XAI platform 102 may train the first iteration of the deep learning model to output similar results to the training information set based on similar inputs. In some instances, to configure and/or otherwise train the first iteration of the deep learning model, the XAI platform 102 may process the historical training information set by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

For example, in configuring and/or otherwise training the first iteration of the deep learning model, the XAI platform 102 may use clustering techniques on the training information set (e.g., a set of various data points, or the like). For instance, the XAI platform 102 may group information of the training information set into one or more clusters of information. In clustering the information, the XAI platform 102 may configure the deep learning model to form a neural network architecture that includes a plurality of neurons, where each neuron represents a connection point capable of receiving and forwarding information through the neural network. The neurons may be interconnected via a plurality of edges. The XAI platform 102 may train the deep learning to configure the neural network based on the training information set and the one or more clusters of information. For example, the XAI platform 102 may use digital logic included in the training information set to identify how the information in the training information set should be clustered (e.g., based on or more parameters, such as grouping information of a similar type together, grouping information corresponding to similar sources together, or the like). After clustering the information in the training information set, the XAI platform 102 may further use the digital logic to generate the clusters of neurons based on the clustered training information. For example, the XAI platform 102 may train the deep learning model to reconstruct the clusters of training information (e.g., using clustering methods such as deep auto-encoders, K-means clustering, or the like) in the form of clusters of neurons in the neural network. In doing so, the XAI platform 102 may train the deep learning model to use the neurons and edges to process additional inputs when the deep learning model is used to perform a given operation to produce desired outputs (which may, e.g., have been included in the training date set).

Additionally or alternatively, the XAI platform 102 may train the deep learning model to identify one or more correlations within the training information set. For instance, the XAI platform 102 may identify that a first historical output included in the training information set corresponds to a first historical input included in the training information set. In these instances, the XAI platform 102 may cause the deep learning model to store a correlation between the first historical input and the first historical output, such that future inputs similar to the first historical input will cause the deep learning model to generate outputs similar to the first historical output.

It should be understood that the above description merely represents examples of how the deep learning model may be trained, and in one or more additional examples further methods of training the deep learning model may be utilized by the XAI platform 102.

At step 202, the XAI platform 102 may establish a connection with the distributed ledger platform 104. For example, the XAI platform 102 may establish a first wireless data connection with the distributed ledger platform 104 to link the distributed ledger platform 104 with the XAI platform 102 (e.g., in preparation for storing a record of the first iteration of the deep learning model, storing records of additional iterations of the deep learning model, parsing records of the deep learning model, and/or other functions). In some instances, the XAI platform 102 may identify whether or not a connection is already established with the distributed ledger platform 104. If a connection is already established with the distributed ledger platform 104, the XAI platform 102 might not re-establish the connection. If a connection is not yet established with the distributed ledger platform 104, the XAI platform 102 may establish the first wireless data connection as described above.

At step 203, the XAI platform 102 may store a record of the first iteration of the deep learning model. In some instances, the record of the first iteration of the deep learning model may include clustering information of the first iteration of the deep learning model. For example, the record may include information identifying how the information used to train the first iteration of the deep learning model is clustered (e.g., information indicating a number of clusters of information, information indicating an amount of information included in each cluster, information indicating a type of information included in each cluster, information indicating a source of information included in each cluster, and/or other clustering information). Additionally or alternatively, in some examples, the record may include rationale information of the first iteration of the deep learning model. For instance, the XAI platform 102 may include information identifying digital logic, rules, or the like used to generate the clusters of information in the deep learning model. For example, the record may include information identifying one or more of: instructions and/or rules included in the training information set used to generate the clusters of the first iteration of the deep learning model, a record of the steps used to train the first iteration of the deep learning model, a record of computer code used to determine how the information should be clustered, and/or other rationale information.

In storing the record of the first iteration of the deep learning model, the XAI platform 102 may store the record to a distributed ledger maintained by the distributed ledger platform 104. For example, the XAI platform 102 may store the record of the first iteration of the deep learning model by adding an entry to the distributed ledger of distributed ledger platform 104, modifying an existing entry of the distributed ledger of distributed ledger platform 104, and/or otherwise including the record in the distributed ledger of the distributed ledger platform 104. In some instances, the XAI platform 102 may communicate with the distributed ledger platform 104 to store the record via the communication interface 113 and while the first wireless data connection is established.

At step 204, the XAI platform 102 may train an additional iteration of the deep learning model. For example, the XAI platform 102 may, after training the first iteration of the deep learning model, generate, evolve, update, and/or otherwise train a second iteration of the deep learning model. Additionally, the XAI platform 102 may subsequently train one or more additional iterations of the deep learning model after training the second iteration of the deep learning model. In some examples, the XAI platform 102 may train the additional iteration of the deep learning model as part of an iterative recording process. In some instances, the iterative recording process may be and/or include a process of automatically updating, evolving, and/or otherwise training the deep learning model over a period of time (e.g., days, weeks, months, years, and/or other periods of time) to periodically generate and/or create additional iterations of the deep learning model, store records of the additional iterations of the deep learning model, and receive one or more outputs of the deep learning model at each iteration of the deep learning model. For example, the iterative recording process may be and/or include repeating the functions described herein at steps 204-206 periodically, continuously, and/or near continuously.

In some examples, in training the additional iteration of the deep learning model, the XAI platform 102 may input one or more new training data sets into the deep learning model. For example, the XAI platform 102 may input new training data sets configured by a program and/or user to modify the outputs of the deep learning model. Based on inputting the one or more new training data sets, the XAI platform 102 may update, generate, and/or otherwise train the additional iteration of the deep learning model using the functions and methods described above at step 201, and/or other functions and methods. Additionally or alternatively, in some instances, the XAI platform 102 may train the additional iteration of the deep learning model by refining, validation, and/or otherwise update the current (i.e., the most recently trained/updated) iteration of the deep learning model. For example, the XAI platform 102 may update the current iteration of the deep learning model by inputting one or more outputs of the current iteration of the deep learning model into the deep learning model. By providing this input to the deep learning model, the XAI platform 102 may create an iterative feedback loop that may continuously and dynamically refine the deep learning model to improve its accuracy. For example, the XAI platform 102 may cause the deep learning model to store one or more new correlations to the one or more outputs of the current iteration of the deep learning model. In some examples, these new correlations may cause the deep learning model to generate one or more future outputs based on the one or more outputs of the current iteration of the deep learning model. The feedback loop may be part of the automatic iterative recording process described above.

Figure 2B:
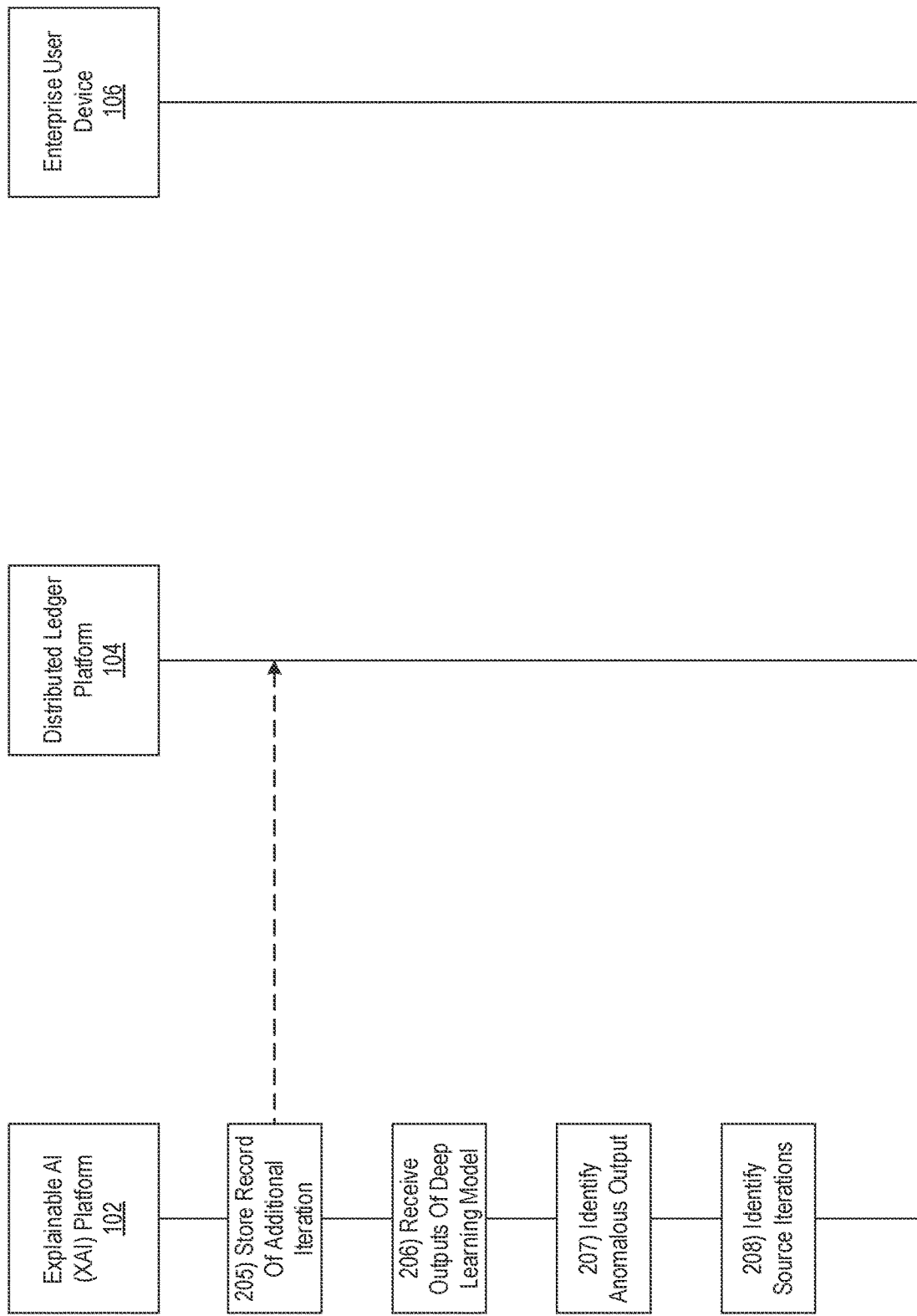

Referring to FIG. 2B, at step 205, the XAI platform 102 may store a record of an additional iteration of the deep learning model. For example, based on generating and/or training an additional iteration of the deep learning model as described above at step 204 (e.g., the second iteration of the deep learning model, and/or other additional iterations of the deep learning model) the XAI platform 102 may store a record of the additional iteration to the distributed ledger maintained by distributed ledger platform 104. In storing the record of the additional iteration of the deep learning model to the distributed ledger platform 104, the XAI platform 102 may store the record by adding an entry to the distributed ledger of distributed ledger platform 104, modifying an existing entry of the distributed ledger of distributed ledger platform 104, and/or otherwise including the record in the distributed ledger of the distributed ledger platform 104. In some instances, the XAI platform 102 may communicate with the distributed ledger platform 104 to store the record of the additional iteration of the deep learning model via the communication interface 113 and while the first wireless data connection is established.

In some examples, the record of the additional iteration of the deep learning model may include clustering information of the additional iteration of the deep learning model. For example, the record may include information identifying how the information used to train and/or generate the additional iteration of the deep learning model is clustered (e.g., information indicating a number of clusters of information, information indicating an amount of information included in each cluster, information indicating a type of information included in each cluster, information indicating a source of information included in each cluster, and/or other clustering information). Additionally or alternatively, in some examples, the record may include rationale information of the additional iteration of the deep learning model. For instance, the XAI platform 102 may include information identifying digital logic, rules, or the like used to generate the clusters of information in the deep learning model. For example, the record may include information identifying one or more of: instructions and/or rules included in input information and/or training data sets used to generate the clusters of the additional iteration of the deep learning model, a record of the steps used to train and/or generate the additional iteration of the deep learning model, a record of computer code used to determine how the information should be clustered, and/or other rationale information.

At step 206, the XAI platform 102 may receive one or more outputs of the deep learning model. For example, the XAI platform 102 may receive the one or more outputs from the current iteration of the deep learning model, as part of the iterative recording process. In receiving the one or more outputs of the deep learning model, the XAI platform 102 may receive results of applying an algorithm to an input of the current iteration of the deep learning model, results of computations performed by the current iteration of the deep learning model, and/or any other outputs capable of being produced by a deep learning model. The one or more outputs of the deep learning model may have been generated by one or more processes the deep learning model was trained to perform at the current iteration of the deep learning model and/or at previous iterations of the deep learning model (e.g., applying algorithms to input information, comparing results of computations to thresholds, processing information via neurons of the deep learning model, and/or other processes).

It should be understood that, as the iterative recording process automatically repeats the functions described above at steps 204-206, the XAI platform 102 may continuously or periodically receive outputs of the deep learning model at each iteration of the deep learning model (e.g., at the first iteration, the second iteration, and/or at one or more additional iterations of the deep learning model).

At step 207, the XAI platform 102 may identify an anomalous output of the deep learning model. For example, at any given iteration of the deep learning model and during the automatic iterative recording process, the XAI platform 102 may parse, review, and/or otherwise interpret the outputs of the deep learning model to identify an anomalous output. In some examples, the anomalous output may be and/or include an output of the deep learning model that does not match one or more expected parameters of outputs of the deep learning model. In some examples, the anomalous output may be an undesired output of the deep learning model (e.g., an output that does not conform to preferred parameters, or the like). In some instances, the anomalous output may be an unexpected, but desired, output of the deep learning model (e.g., an output that exceeds one or more minimum benchmarks established by a program and/or user of the XAI platform 102).

In some examples, in identifying the anomalous output, the XAI platform 102 may identify an anomalous data point. For example, the XAI platform 102 may identify one or more data points, included in the one or more outputs of the deep learning model, that toggles between different clusters of neurons and/or nodes of the deep learning model. For instances, a data point may toggle between two different clusters of neurons and/or nodes that each correspond to a particular type of information (e.g., account information, enterprise information, activity history information corresponding to a client of the enterprise organization, and/or any other information used by the deep learning model). In these examples, the XAI platform 102 may identify the one or more data points that toggle between clusters as an anomalous output.

Additionally or alternatively, in some instances, in identifying the anomalous output the XAI platform 102 may perform one or more comparisons between the one or more outputs and thresholds. In some examples, the thresholds may be and/or include benchmarks, minimum specifications, maximum specifications, and/or other parameters configured to provide indications of desired outputs. In these examples, the XAI platform 102 may compare the one or more outputs to the thresholds and identify, as the anomalous output, an output that corresponds to a score that satisfies the thresholds.

Consider a scenario where the one or more outputs are and/or include one or more scores corresponding to the outputs of the deep learning model (e.g., performance scores, risk scores, and/or any other type of scores). The one or more scores may be and/or include integer values, decimal values, percentages, and/or other values. In such scenarios, the XAI platform 102 may compare the one or more scores to a threshold score to determine whether the one or more scores satisfy the threshold score. Based on comparing the one or more scores to the threshold score, the XAI platform 102 may identify a score that satisfies the threshold score. For example, in some instances, the threshold score may be a maximum specification that is satisfied by a score that meets or exceeds the threshold score. In such an example, the XAI platform 102 may identify a score that meets or exceeds the maximum specification as satisfying the threshold score. Additionally or alternatively, in some examples, the threshold score may be a minimum specification that is satisfied by a score that does not exceed the threshold score. In such an example, the XAI platform 102 may identify a score that does not exceed the minimum specification as satisfying the threshold score. Based on identifying a score that satisfies the threshold score, the XAI platform 102 may identify an output corresponding to the score that satisfies the threshold score as the anomalous output.

Although a single anomalous output is described above, it should be understood that the XAI platform 102 may perform the functions related to the anomalous output described herein for one or more additional anomalous outputs, in the same or in different iterations of the iterative recording process. For example, the XAI platform 102 may perform the functions described at steps 207-213 one or more additional times at the current iteration of the deep learning and/or one or more additional times at additional iterations of the deep learning model, without departing from the scope of this disclosure.

At step 208, based on identifying the anomalous output, the XAI platform 102 may identify one or more source iterations of the deep learning model corresponding to the anomalous output. In some examples, in identifying the source iterations, the XAI platform 102 may pause the iterative recording process until the functions described herein at steps 208-210 have been performed. In other examples, the XAI platform 102 may perform the functions described at steps 208-210 while the iterative recording process continues to generate additional iterations of the deep learning model. In identifying the one or more source iterations, the XAI platform 102 may parse one or more of the records of the deep learning model stored at the distributed ledger of distributed ledger platform 104. In some examples, the XAI platform 102 may parse the records of the deep learning model to identify one or more unique records of the deep learning model that include, in each unique record, an indication that one or more data points associated with the anomalous output (e.g., information indicating a process, algorithm, computation, parameter, and/or other information related to generating the anomalous output) diverged from a first cluster of the deep learning model to a second cluster of the deep learning model.

For example, the XAI platform 102 may, by parsing the records of the deep learning model, identify a unique record that includes clustering information and/or rationale information indicating that a data point associated with the anomalous record was clustered in a first cluster of the deep learning model at a previous iteration of the deep learning model but, based on the unique record, was clustered in a second cluster of the deep learning model at the iteration of the deep learning model corresponding to the unique record. For instance, in some examples, the XAI platform 102 may parse one or more records of the deep learning model and, by parsing the records, identify rationale information indicating an instruction and/or other rationale information directing the deep learning model to cluster the data point in the second cluster of the deep learning model. Additionally or alternatively, the XAI platform 102 may, by parsing the records, identify clustering information indicating that the data point diverged from the first cluster to the second cluster.

Accordingly, the XAI platform 102 may identify the iteration of the deep learning model corresponding to the unique record as a source iteration. It should be understood that the XAI platform 102 may perform the process described above for one or more additional data points associated with the anomalous output, and thus identify one or more additional source iterations corresponding to one or more additional unique records.

In some examples, in identifying the one or more source iterations, the XAI platform 102 may identify a first record indicating that a data point associated with the anomalous output diverged from a first cluster of the deep learning model to a second cluster of the deep learning model, as described above. In some instances, the XAI platform 102 may select the iteration of the deep learning model that corresponds to the first record as the one or more source iterations and may proceed to step 209. In other instances, the XAI platform 102 may continue to parse records of the deep learning model until each entry of the distributed ledger has been parsed. In parsing each entry of the distributed ledger, the XAI platform 102 may identify a plurality of unique records, each indicating that a data point associated with the anomalous output diverged from a first cluster of the deep learning model to a second cluster of the deep learning model. In these instances, the XAI platform 102 may select a plurality of iterations of the deep learning model corresponding to the plurality of records as the one or more source iterations. Accordingly, the XAI platform 102 may perform the functions described below at steps 209-213 for each source iteration.

Figure 2C:
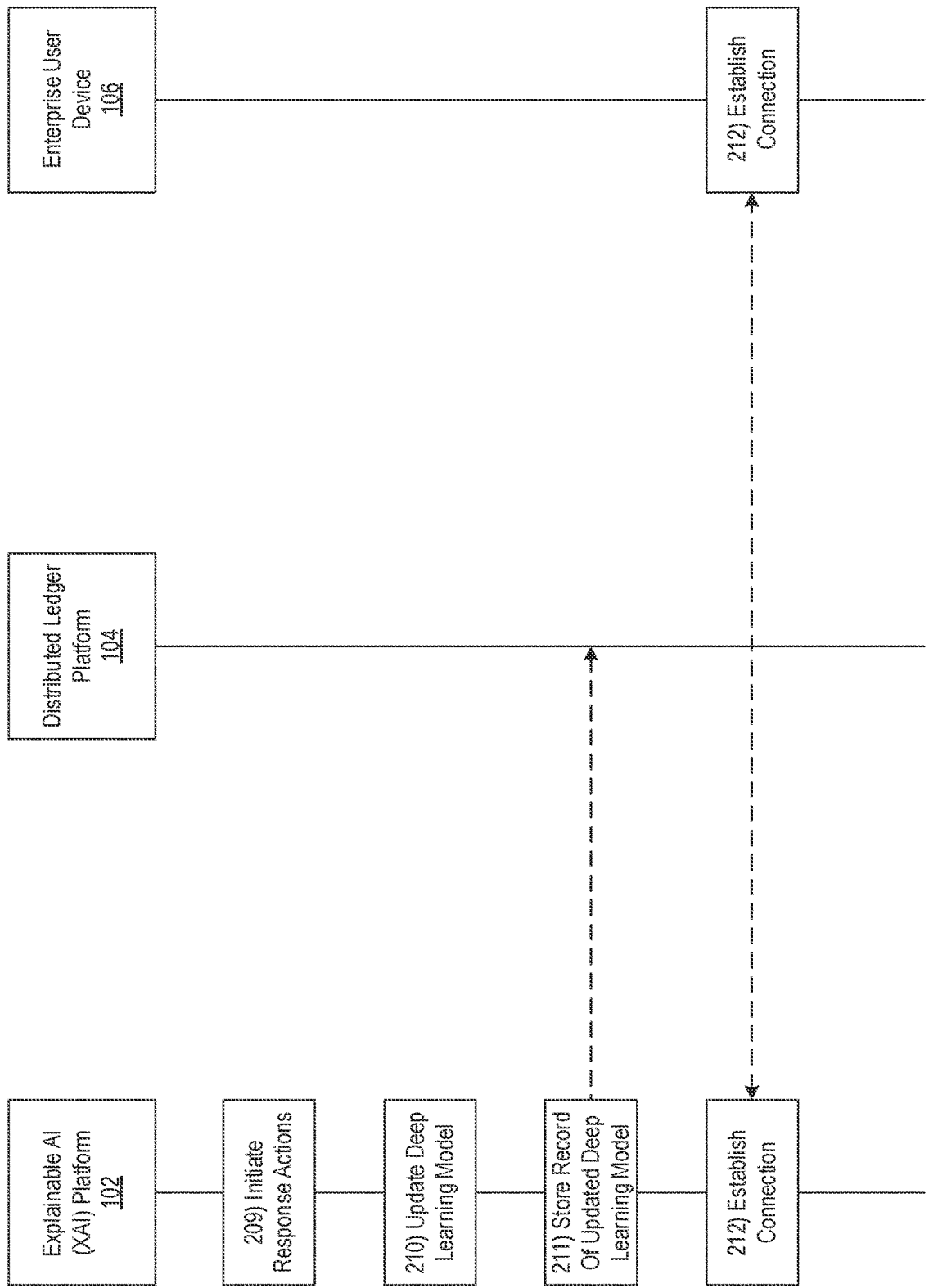

Referring to FIG. 2C, at step 209, based on identifying the one or more source iterations of the anomalous output, the XAI platform 102 may initiation one or more response actions. For example, in some instances, the XAI platform 102 may initiate one or more response actions configured to prevent additional anomalous outputs. In some instances, the one or more response actions may be configured to prevent additional anomalous outputs by causing the deep learning model to generate outputs that conform with one or more current parameters. Additionally or alternatively, in some examples, the one or more response actions may be configured to prevent additional anomalous outputs by causing the deep learning model to produce future outputs conforming to the anomalous output.

The one or more response actions may be and/or include one or more of: removing a feature of the deep learning model (e.g., removing code and/or algorithms that cause the deep learning model to perform a particular function, modifying and/or removing parameters controlling the potential outputs of the deep learning model, and/or otherwise remove a feature of the deep learning model), modifying one or more clusters of neurons of the deep learning model (e.g., by providing instructions and/or other rationale information to clause modification of one or more clusters of neurons, and/or by other means), reverting to a previous iteration of the deep learning model, adjusting one or more weights corresponding to an algorithm of the deep learning model, and/or other response actions. In some examples, the XAI platform 102 may initiate the one or more response actions automatically after identifying the one or more source iterations. Additionally or alternatively, in some instances, the XAI platform 102 may initiate the one or more response actions based on user input (e.g., from a user associated with the XAI platform 102) directing the XAI platform 102 to initiate the one or more response actions. In some examples, the XAI platform 102 may, automatically and/or based on user input, initiate the one or more response actions based on a ruleset (e.g., a service-level agreement, or the like) identifying one or more parameters for modifying the deep learning model. In some instances, the one or more response actions may be and/or include sending a notification to an enterprise user device (e.g., enterprise user device 106, or the like), as described below at steps 212-213.

At step 210, the XAI platform 102 may refine, validate, and/or otherwise update the deep learning model. In some examples, the XAI platform 102 may update the deep learning model based on initiating the one or more response actions. For instance, the XAI platform 102 may update the deep learning model by removing a feature of the deep learning model, modifying one or more clusters of neurons of the deep learning model, reverting to a previous iteration of the deep learning model, adjusting one or more weights corresponding to an algorithm of the deep learning model, and/or otherwise update the deep learning model based on initiating the one or more response actions described above at step 209.

Additionally or alternatively, in some instances, the XAI platform 102 may update the deep learning model based on the anomalous output. For example, in some instances, updating the deep learning model may include inputting the anomalous output into the deep learning model. By providing this input into the deep learning model, the XAI platform 102 may create an iterative feedback loop that may continuously and dynamically refine the deep learning model to improve its accuracy. For example, based on inputting the anomalous output, the XAI platform 102 may cause the deep learning model to generate outputs in future iterations of the feedback loop by storing, based on the anomalous output, one or more correlations between the anomalous output and the processes, algorithms, computations, and/or other parameters used to generate the outputs of the deep learning model. Accordingly, in future iterations of the feedback loop, the deep learning model may generate outputs similar to and/or based on the anomalous output (e.g., in situations where the anomalous output is an unexpected, but desired, output of the deep learning model, and/or other situations).

In updating the deep learning model, the XAI platform 102 may improve the accuracy and effectiveness of the deep learning model, which may, e.g., result in more efficient training of machine learning models trained by the XAI platform 102 in future iterations of the iterative recording process (and may in some instances, conserve computing and/or processing power/resources in doing so). The XAI platform 102 may further cause the deep learning model to improve the methods of providing explainable AI described herein by continuing to maintain records of the deep learning model to identify source iterations of anomalous outputs, as described above.

At step 211, based on updating the deep learning model, the XAI platform 102 may store a record of the updated deep learning model. For example, the XAI platform 102 may store a record of the updated deep learning model to the distributed ledger maintained by distributed ledger platform 104. In storing the record of the updated deep learning model to the distributed ledger platform 104, the XAI platform 102 may store the record by adding an entry to the distributed ledger of distributed ledger platform 104, modifying an existing entry of the distributed ledger of distributed ledger platform 104, and/or otherwise including the record in the distributed ledger of the distributed ledger platform 104. In some instances, the XAI platform 102 may communicate with the distributed ledger platform 104 to store the record of the updated deep learning model via the communication interface 113 and while the first wireless data connection is established. In some instances, if the XAI platform 102 previously paused the iterative recording process (e.g., as described above at step 207), the XAI platform 102 may, based on updating the deep learning model, resume the iterative recording process and continue to perform the functions described above at steps 204-206 for one or more additional iterations of the iterative recording process.

In some examples, the record of the updated deep learning model may include clustering information of the updated deep learning model. Additionally or alternatively, in some examples, the record may include rationale information of the updated deep learning model. Additionally or alternatively, the record of the updated deep learning model may include information associated with the one or more response actions (e.g., rules and/or instructions indicating how the updated deep learning model was updated based on the one or more response actions).

At step 212, based on or in response to initiating the one or more response actions and/or based on or in response to updating the deep learning model, the XAI platform 102 may establish a connection with the enterprise user device 106. For example, the XAI platform 102 may establish a second wireless data connection with the enterprise user device 106 to link the enterprise user device 106 with the XAI platform 102 (e.g., in preparation for ending a notification, causing display of an interface, and/or other functions). In some instances, the XAI platform 102 may identify whether or not a connection is already established with the enterprise user device 106. If a connection is already established with the enterprise user device 106, the XAI platform 102 might not re-establish the connection. If a connection is not yet established with the enterprise user device 106, the XAI platform 102 may establish the second wireless data connection as described above.

Figure 2D:
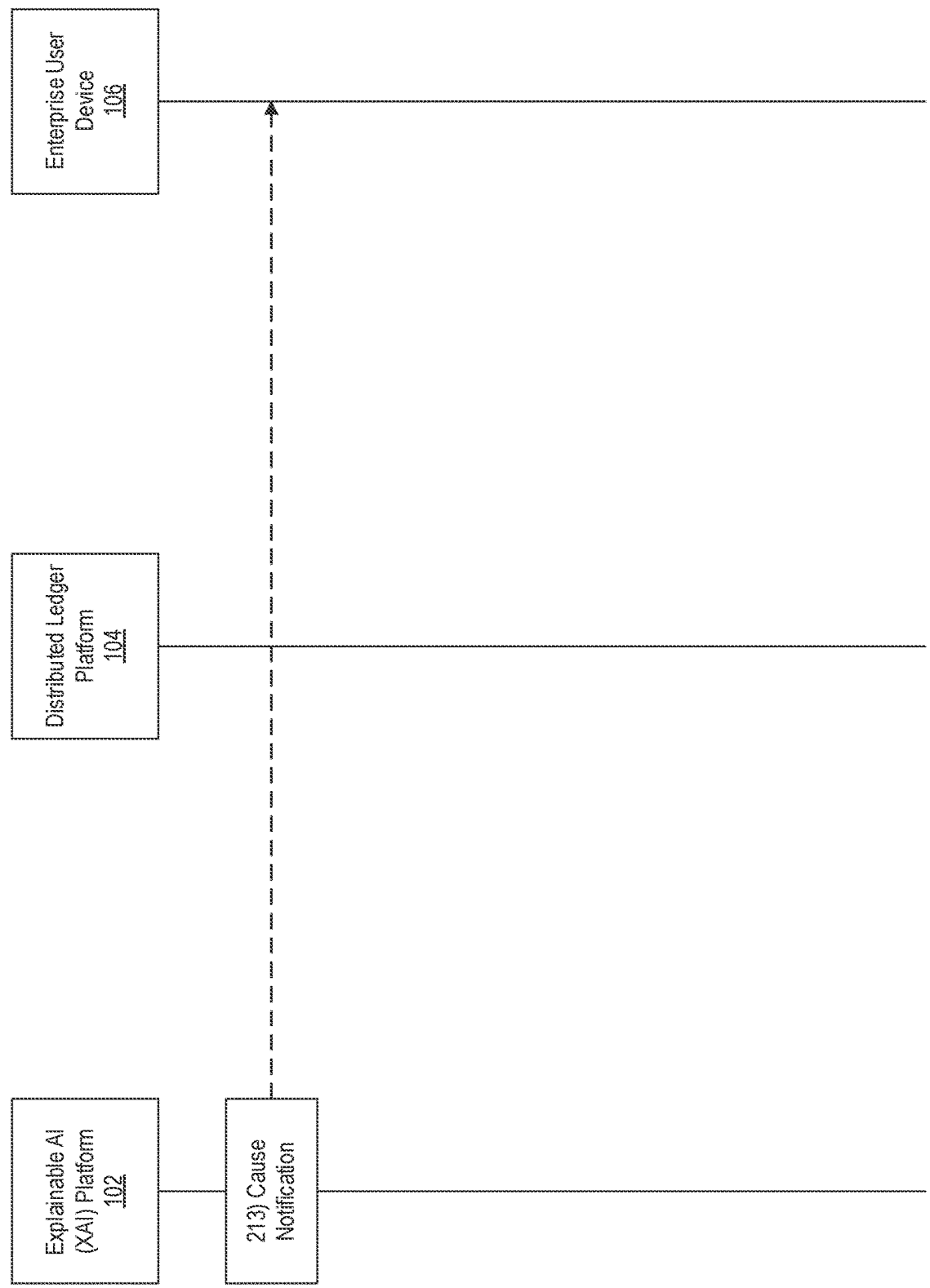

Referring to FIG. 2D, at step 213, the XAI platform 102 may cause a notification of the identification of the anomalous output and the one or more source iterations at the enterprise user device 106. For example, in causing the notification, the XAI platform 102 may transmit and cause display of a user interface on the enterprise user device 106. For example, the XAI platform 102 may transmit and cause the enterprise user device 106 to display an AI explanation interface.

Figure 3:
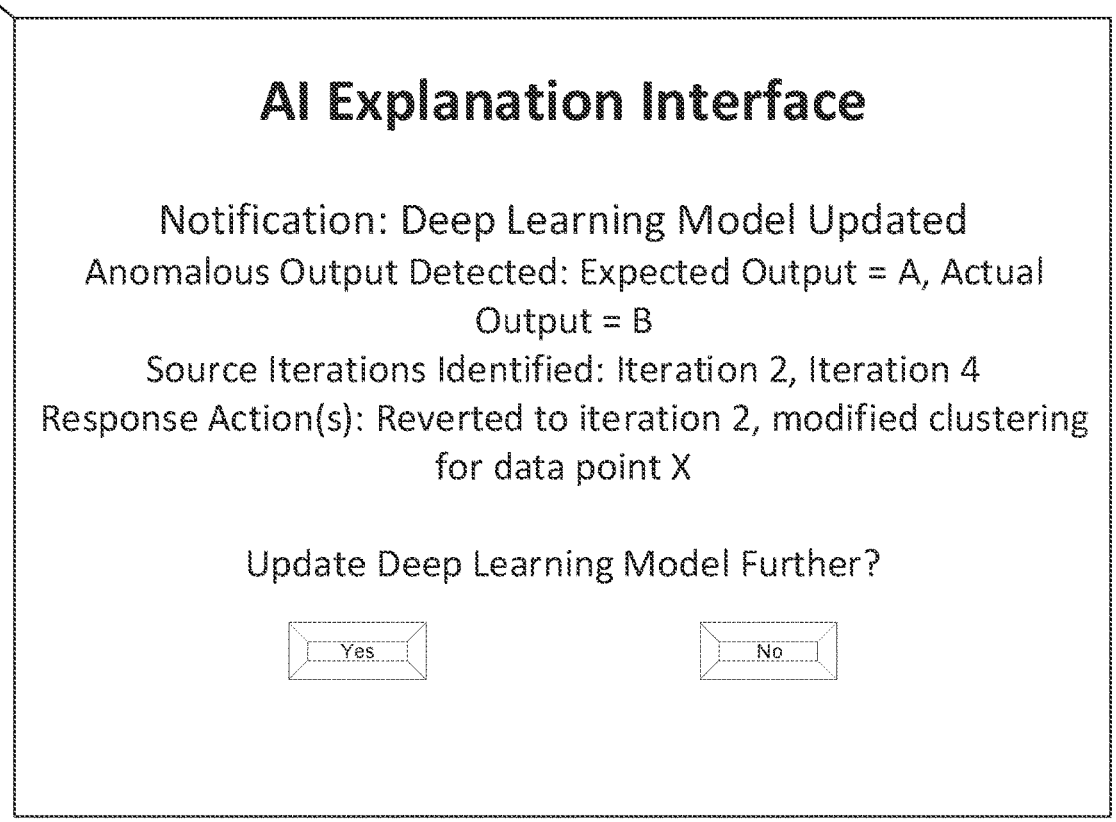
FIG. 3 depicts an illustrative graphical user interface depicting an AI explanation interface generated as part of providing explainable AI using distributed ledger technology in accordance with one or more example arrangements.

In displaying the AI explanation interface, the enterprise user device 106 may display a graphical user interface similar to AI explanation interface 300, which is illustrated in FIG. 3. Referring to FIG. 3, in some instances, the AI explanation interface 300 may include information corresponding to the deep learning model that explains (1) the anomalous output and (2) how the anomalous output affected the deep learning model. For example, the AI explanation interface 300 may include information such as a notification that the deep learning model has been updated, an indication that an anomalous output was detected, an indication of what the anomalous output was, an indication of the one or more source iterations identified by the XAI platform 102, an indication of the response actions initiated by the XAI platform 102, and/or other information. The AI explanation interface 300 may also display interface elements or selectable options requesting user input. For example, the AI explanation interface 300 may display one or more of: an information entry field, a button or buttons, toggle or toggles, check box or boxes, and/or other interface elements. For example, as illustrated in FIG. 3, the interface elements may be one or more buttons the user might toggle to update the deep learning model further. In some instances, based on user input requesting that the deep learning model be updated further, the XAI platform 102 may perform the functions described above at step 210 again based on one or more additional parameters and/or instructions provided by the user.

Figure 4:
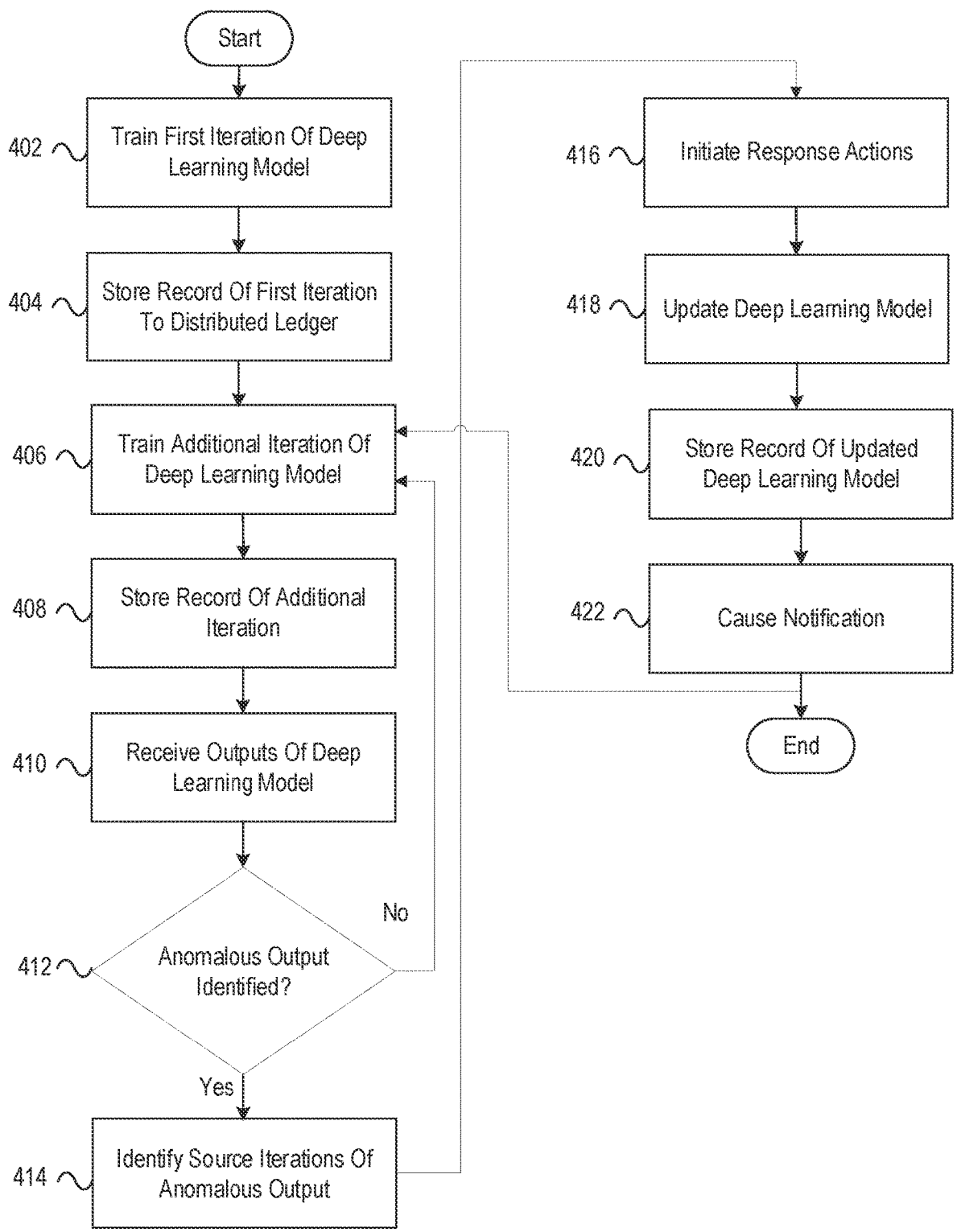
FIG. 4 depicts an illustrative method for providing explainable AI using distributed ledger technology in accordance with one or more example arrangements.

FIG. 4 depicts an illustrative method for providing explainable AI using distributed ledger technology in accordance with one or more example arrangements. Referring to FIG. 4, at step 402, a computing device having at least one processor, a communication interface, and memory may train a first iteration of a deep learning model. At step 404, the computing platform may store a record of the first iteration of the deep learning model to a distributed ledger. For example, the computing platform may store a record of the clustering information and/or of the rationale information of the first iteration of the deep learning model. At step 406, the computing platform may train an additional iteration of the deep learning model. At step 408, the computing platform may store a record of the additional iteration of the deep learning model. For example, the computing platform may store a record of the clustering information and/or of the rationale information of the rationale information of the additional iteration of the deep learning model to the distributed ledger. At step 410, the computing platform may receive outputs of the deep learning model. For example, the computing platform may receive outputs of a current iteration of the deep learning model, which may be or include a most recently trained iteration of the model. At step 412, the computing platform may determine whether an anomalous output of the deep learning model is included in the outputs of the deep learning model. Based on determining that no anomalous outputs have been detected, the computing platform may return to step 406 as part of an iterative reporting process and repeat steps 406-412. Based on determining that an anomalous output has been detected, the computing platform may proceed to step 414.

At step 414, the computing platform may identify one or more source iterations corresponding to the anomalous output. For example, the computing platform may identify one or more iterations of the deep learning model that caused the anomalous output to be generated. At step 416, the computing platform may initiate one or more response actions based on identifying the anomalous output. At step 418, the computing platform may update the current iteration of the deep learning model based on initiating the one or more response actions. At step 420, the computing platform may store a record of the updated deep learning model. For example, the computing platform may store the record of the updated deep learning model to the distributed ledger. At step 422, the computing platform may cause notification of the anomalous output and/or of the one or more response actions. In some examples, after completing step 422, the computing platform may return to step 406 as part of an iterative recording process and may repeat steps 406-422.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
 train a first iteration of a deep learning model based on a training data set, wherein training the first iteration of the deep learning model configures the deep learning model to output results based on input data;
 store, to a distributed ledger, a record of the first iteration of the deep learning model, wherein the record comprises:
  first clustering information, wherein the first clustering information identifies clusters of information of the first iteration of the deep learning model; and
  first rationale information, wherein the first rationale information identifies digital logic used to generate the clusters of information;
 automatically perform an iterative recording process for training the deep learning model, wherein the iterative recording process stores records of additional iterations of the deep learning model;
 receive, while performing the iterative recording process, one or more outputs of the deep learning model;
 identify, based on the one or more outputs, an anomalous output;
 identify, by parsing the distributed ledger and based on identifying the anomalous output, one or more source iterations of the deep learning model, wherein the one or more source iterations correspond to the anomalous output; and
 initiate, based on identifying the one or more source iterations, one or more response actions configured to prevent additional anomalous outputs.

2. The computing platform of claim 1, wherein the iterative recording process begins at the first iteration of the deep learning model, as a current iteration, and comprises:
 generating a second iteration of the deep learning model;
 based on generating the second iteration of the deep learning model, storing a second record of the second iteration to the distributed ledger, wherein the second record comprises second clustering information and second rationale information; and
 automatically repeating, in one or more additional iterations of the iterative recording process, the iterative recording process for one or more additional iterations of the deep learning model.

3. The computing platform of claim 1, wherein the memory stores one or more additional computer-readable instructions that, when executed by the at least one processor, cause the computing platform to:
 update, based on initiating the one or more response actions, the deep learning model.

4. The computing platform of claim 3, wherein the memory stores one or more additional computer-readable instructions that, when executed by the at least one processor, cause the computing platform to:
 store, based on updating the deep learning model, a record of the updated deep learning model to the distributed ledger.

5. The computing platform of claim 3, wherein the memory stores one or more additional computer-readable instructions that, when executed by the at least one processor, cause the computing platform to:
 pause, based on identifying the anomalous output, the iterative recording process; and
 resume, based on updating the deep learning model, the iterative recording process.

6. The computing platform of claim 1, wherein the instructions, when executed by the at least one processor, cause the computing platform to identify the anomalous output by:
 comparing one or more scores, generated by the deep learning model and corresponding to the one or more outputs, to a threshold score;
 identifying, based on the comparing, a score that satisfies the threshold score; and
 identifying, as the anomalous output, an output corresponding to the score that satisfies the threshold score.

7. The computing platform of claim 1, wherein the anomalous output comprises a data point that toggles between different clusters of nodes of the deep learning model.

8. The computing platform of claim 1, wherein the one or more source iterations each correspond to a unique record, stored in the distributed ledger, comprising an indication that a data point associated with the anomalous output diverged from a first cluster of the deep learning model to a second cluster of the deep learning model.

9. The computing platform of claim 1, wherein the instructions, when executed by the at least one processor, cause the computing platform to identify the one or more source iterations by:
 identifying, by parsing the distributed ledger, a first record indicating that a data point associated with the anomalous output diverged from a first cluster of the deep learning model to a second cluster of the deep learning model; and selecting, based on identifying the first record, an iteration of the deep learning model corresponding to the first record as the one or more source iterations.

10. The computing platform of claim 1, wherein the instructions, when executed by the at least one processor, cause the computing platform to identify the one or more source iterations by:

identifying, by parsing each entry of the distributed ledger, a plurality of records indicating that a data point associated with the anomalous output diverged from a first cluster of the deep learning model to a second cluster of the deep learning model; and selecting, based on identifying the plurality of records, a plurality of iterations of the deep learning model corresponding to the plurality of records as the one or more source iterations.

11. The computing platform of claim 1, wherein the instructions, when executed by the at least one processor, cause the computing platform to initiate the one or more response actions based on a ruleset identifying one or more parameters for modifying the deep learning model.

12. The computing platform of claim 1, wherein the one or more response actions comprise one or more of:

removing a feature of the deep learning model, modifying one or more clusters of neurons of the deep learning model, reverting to a previous iteration of the deep learning model, or adjusting one or more weights corresponding to an algorithm of the deep learning model.

13. A method comprising:

at a computing device comprising at least one processor, a communication interface, and memory:

training a first iteration of a deep learning model based on a training data set, wherein training the first iteration of the deep learning model configures the deep learning model to output results based on input data;

storing, to a distributed ledger, a record of the first iteration of the deep learning model, wherein the record comprises:

first clustering information, wherein the first clustering information identifies clusters of information of the first iteration of the deep learning model; and first rationale information, wherein the first rationale information identifies digital logic used to generate the clusters of information;

automatically performing an iterative recording process for training the deep learning model, wherein the iterative recording process stores records of additional iterations of the deep learning model;

receiving, while performing the iterative recording process, one or more outputs of the deep learning model;

identifying, based on the one or more outputs, an anomalous output;

identifying, by parsing the distributed ledger and based on identifying the anomalous output, one or more source iterations of the deep learning model, wherein the one or more source iterations correspond to the anomalous output; and initiating, based on identifying the one or more source iterations, one or more response actions configured to prevent additional anomalous outputs.

14. The method of claim 13, wherein the iterative recording process begins at the first iteration of the deep learning model, as a current iteration, and comprises:

generating a second iteration of the deep learning model;

based on generating the second iteration of the deep learning model, storing a second record of the second iteration to the distributed ledger, wherein the second record comprises second clustering information and second rationale information; and automatically repeating, in one or more additional iterations of the iterative recording process, the iterative recording process for one or more additional iterations of the deep learning model.

15. The method of claim 13, wherein identifying the anomalous output comprises:

comparing one or more scores, generated by the deep learning model and corresponding to the one or more outputs, to a threshold score;

identifying, based on the comparing, a score that satisfies the threshold score; and identifying, as the anomalous output, an output corresponding to the score that satisfies the threshold score.

16. The method of claim 13, wherein identifying the one or more source iterations comprises:

identifying, by parsing the distributed ledger, a first record indicating that a data point associated with the anomalous output diverged from a first cluster of the deep learning model to a second cluster of the deep learning model; and selecting, based on identifying the first record, an iteration of the deep learning model corresponding to the first record as the one or more source iterations.

17. One or more non-transitory computer-readable media storing instructions that, when executed by a computing platform comprising at least one processor, a communication interface, and memory, cause the computing platform to:

train a first iteration of a deep learning model based on a training data set, wherein training the first iteration of the deep learning model configures the deep learning model to output results based on input data;

store, to a distributed ledger, a record of the first iteration of the deep learning model, wherein the record comprises:

first clustering information, wherein the first clustering information identifies clusters of information of the first iteration of the deep learning model; and first rationale information, wherein the first rationale information identifies digital logic used to generate the clusters of information;

automatically perform an iterative recording process for training the deep learning model, wherein the iterative recording process stores records of additional iterations of the deep learning model;

receive, while performing the iterative recording process, one or more outputs of the deep learning model;

identify, based on the one or more outputs, an anomalous output;

identify, by parsing the distributed ledger and based on identifying the anomalous output, one or more source iterations of the deep learning model, wherein the one or more source iterations correspond to the anomalous output; and initiate, based on identifying the one or more source iterations, one or more response actions configured to prevent additional anomalous outputs.

18. The one or more non-transitory computer-readable media of claim 17, wherein the iterative recording process begins at the first iteration of the deep learning model, as a current iteration, and comprises:
generating a second iteration of the deep learning model;
based on generating the second iteration of the deep learning model, storing a second record of the second iteration to the distributed ledger, wherein the second record comprises second clustering information and second rationale information; and
automatically repeating, in one or more additional iterations of the iterative recording process, the iterative recording process for one or more additional iterations of the deep learning model.

19. The one or more non-transitory computer-readable media of claim 17, storing instructions that, when executed, cause the computing platform to identify the anomalous output by:
comparing one or more scores, generated by the deep learning model and corresponding to the one or more outputs, to a threshold score;
identifying, based on the comparing, a score that satisfies the threshold score; and
identifying, as the anomalous output, an output corresponding to the score that satisfies the threshold score.

20. The one or more non-transitory computer-readable media of claim 17, storing instructions that, when executed, cause the computing platform to identify the one or more source iterations by:
identifying, by parsing the distributed ledger, a first record indicating that a data point associated with the anomalous output diverged from a first cluster of the deep learning model to a second cluster of the deep learning model; and
selecting, based on identifying the first record, an iteration of the deep learning model corresponding to the first record as the one or more source iterations.

* * * * *